United States Patent [19]
Polaski

[11] 3,894,982
[45] July 15, 1975

[54] ADHESIVE COMPOSITIONS
[75] Inventor: Eugene L. Polaski, Erie, Pa.
[73] Assignee: Lord Corporation, Erie, Pa.
[22] Filed: July 15, 1974
[21] Appl. No.: 488,641

[52] U.S. Cl. ................. 260/33.6 A; 260/33.6 UA;
       260/94.7 A; 260/94.7 N; 260/94.7 S
[51] Int. Cl. .......................... C08f 45/28; C08f 1/88
[58] Field of Search..... 260/33.6 A, 94.7 A, 94.7 N,
       260/94.7 S, 37.32

[56] References Cited
UNITED STATES PATENTS
3,813,351  5/1974  Thomson ................... 260/33.6 A X
3,840,616  10/1974  Clark et al. ................ 260/94.7 N X

*Primary Examiner*—Lewis T. Jacobs

[57] ABSTRACT

Adhesive compositions comprising at least one polydiene characterized by a vinyl content of at least 50 weight percent and at least one polyfunctional aminoorganosilane can be utilized for bonding vulcanizable elastomers, including sulfur-vulcanizable and free radical-vulcanizable elastomers, to themselves and other substrates.

23 Claims, No Drawings

ADHESIVE COMPOSITIONS

This invention relates to adhesive compositions. More particularly, this invention relates to adhesive compositions suitable for bonding divers elastomers to substrate materials.

Adhesive compositions have been extensively used in the bonding of natural and synthetic elastomers either to themselves or to other substrates to form laminates and composite articles. In many instances, the commercial acceptance was due in so small measure to their being the best of otherwise poor adhesives for the intended use. Quite often, such adhesives were only useful in bonding specific elastomers to specific substrates, and thus were sadly lacking in versatility. With most, while the compositions may have been adequate at the time of their development with the elastomers and under use conditions then prevailing, as the variety of new and different synthetic elastomers burgeoned; as the areas in which both natural and synthetic elastomers could be advantageously used expanded; as the conditions of use, including temperature, flexibility, load carrying, environmental conditions, and the like, became more severe; their use, particularly in the absence of extensive experimentation to find prior art adhesives which were suitable or could be modified, became less desirable. At no time has the use of any of the prior art adhesive compositions precluded continued research toward the development of more acceptable adhesive materials; indeed, their use has generally inspired such research, particularly as the chemical industry developed new materials which simply could not be effectively bonded with the prior art adhesive compositions then in use.

Adhesive compositions which have been employed in the past have included admixtures of chlorinated rubber and at least one polyalkylene polyamine adhesion promoter; mixtures of halogenated ethylene-propylene copolymer and sulfur; mixtures of chlorosulfonated polyethylene, orthoalkoxy aryl diisocyanates and dinitrosobenzene; chlorinated rubber-epoxylated novolak-epoxy resin curing agent admixtures; mixtures comprising chlorine-containing polymers, polyisocyanates, epoxylated novolaks, gammamethacryloxypropyltrimethoxysilane and dinitrosobenzene; and the like.

One such prior art adhesive composition is disclosed in Bradley et al., U.S. Pat. No. 2,459,742, wherein it is disclosed that chlorinated rubber adhesive compositions containing at least one polyalkylene polyamine adhesion promoter can be employed for bonding natural rubber, polychloroprene, polybutadiene, butadiene-styrene copolymer, and butadiene-acrylonitrile copolymer elastomers to substrates such as metals, plastics, textiles and paper.

Adhesive compositions which have been widely used commercially are disclosed in Coleman et al., U.S. Pat. No. 3,258,388, which provides for the incorporation of poly-C-nitroso aromatic compounds into conventional rubber-to-metal adhesives to improve rubber-to-metal adhesion. The conventional adhesives include compositions containing thermosetting condensation polymers; polymers and copolymers of polar ethylenically unsaturated materials; halogenated rubbers; and polyisocyanates.

DeCrease et al., U.S. Pat. No. 3,282,883 disclose a class of adhesive compositions which have been commercially utilized for bonding natural and synthetic rubbers, e.g., EPM, EPDM, neoprene, styrene-butadiene rubber, butyl rubber, halobutyl rubber, butadiene-acrylonitrile rubber, halosulfonated polyethylene rubber, polyurethane rubber, and polyacrylate rubber, to themselves or other substrates, such as metals. The adhesive compositions disclosed by DeCrease et al. comprise chlorosulfonated polyethylene, orthoalkyloxy aryl diisocyanates and dinitrosobenzene.

Gladding et al., Canadian Pat. No. 729,596 disclose bonding elastomeric materials to substrates such as metals by utilizing an adhesive layer of chlorosulfonated polyethylene, a second layer of cured rubber such as polyisochloroprene as an interlayer, and a third adhesive composition comprising polyisocyanates and/or a polychlorinated natural rubber to provide an interlayer of rubber-to-metal bond. Quite obviously, the Gladding et al. system is cumbersome.

Among the most recently proposed adhesive compositions for bonding vulcanizable elastomers to substrate surfaces are adhesive compositions comprising certain functionally active polyalkadienes (e.g., hydroxyl-functional polybutadiene) in combination with a free radical generator in association with certain vinyl organo silane compounds. A critical feature of these adhesive systems is the requirement that sulfur not be present during the vulcanization or curing cycle. Thus, these systems appear limited is use to free-radical-vulcanizable elastomers, since the presence of sulfur appears to be deleterious to the adhesive bond. Even in the absence of sulfur, such systems appear to be quite specific, since they are not effective with all free radical-vulcanizable stocks. The inability of these systems to effectively bond elastomers which are cured with elemental sulfur or sulfur-releasing compounds is particularly distressing, since sulfur vulcanization is still the predominant means of curing natural and synthetic elastomers.

Thus, there remains a need for new adhesive compositions, preferably single-coat adhesive compositions, which are effective for bonding vulcanizable, particularly sulfur-vulcanizable, elastomers to themselves and other substrates.

An object of this invention is to provide novel adhesive compositions suitable for bonding elastomeric materials to themselves and other substrates.

In accordance with the present invention, it has been discovered that compositions comprising at least one polydiene characterized by a high vinyl content and at least one polyfunctional aminoorganosilane are unexpectedly effective as adhesive materials for bonding vulcanizable elastomers, including sulfur-vulcanizable and free radical-vulcanizable elastomers, to themselves or other solid structural substrates. If desired, conventional additives such as fillers, dyes, pigments, extenders, and the like can be incorporated into the novel compositions of the invention. The compositions of this invention are characterized by the unexpected ability to provide strong rubber-to-metal bonds without the necessity of first priming the metal surface; however, the use of conventional substrate primer compositions does enhance the strength of the adhesive bond. Thus the compositions of this invention have been found to be effective as one-coat adhesive materials, particularly for peroxide-curing elastomers such as EPDM, EPR, and silicone elastomers, and as two-coat adhesive materials when used with conventional substrate primers. Besides providing excellent primary adhesion, the compositions of the invention exhibit excellent shelf-life stability, excellent resistance to sweeping during transfer type molding operations and are highly stable at environmental conditions of use.

The essential components of the herein described adhesive compositions consist of at least one polyalkadiene having a high vinyl content and at least one aminoorganosilane. The polyalkadiene is more particularly characterized by a vinyl content of at least about 50 weight percent, preferably of at least 70 weight percent, based on total weight of olefinic unsaturation. The aminoorganosilane is more particularly characterized by the presence of one organic chain having at least one amino nitrogen atom connected to silicon through an organic group containing not less than 3 carbon atoms. Generally, the aminoorganosilane component will be present in an amount in the range of from about 2 to about 50, preferably in the range of about 10 to about 40, parts by weight per 100 parts by weight of polyalkadiene. Preferably, the adhesive compositions will be compounded with an appropriate inert solvent or diluent to provide an adhesive lacquer having a viscosity in the range of about 25 to about 5000, preferably about 50 to about 250, centipoises at a total solids content (TSC) in the range of about 3 to about 30, preferably about 5 to about 20, percent. If desired, conventional additives such as are normally used in adhesive compositions, e.g., fillers, colorants, extenders, and the like, can be included in the adhesive formulations of the invention. Optionally, the adhesive formulations of this invention can include from about 0.5 to about 10, preferably about 2 to about 6, parts by weight per 100 parts by weight of polyalkadiene organic peroxide free radical initiator. The use of such free radical initiators in the herein described adhesive formulations can be effective to afford increased adhesion.

The polyalkadiene materials which are suitable for use in forming the adhesive compositions described herein are polymeric materials selected from the group consisting of polyalkadienes, hydroxyl-terminated polyalkadienes, chain-extended hydroxyl-terminated polyalkadienes, carboxyl-terminated polyalkadienes, chain-extended carboxyl-terminated polyalkadienes, mercaptan-terminated polyalkadienes, chain-extended mercaptan-terminated polyalkadienes, amine-terminated polyalkadienes, chain-extended amine-terminated polyalkadienes, and their equivalents. Where used in this specification and claims, the term "polyalkadiene" is understood to refer to polymers of at least one conjugated diene having from 4 to 12 carbon atoms and includes copolymers of at least one such conjugated diene and at least one other monomer copolymerizable therewith. As noted, the polyalkadienes can be unmodified, e.g., polybutadiene, poly(butadiene-styrene), and the like; or modified, as by having hydroxyl or carboxyl termination and including chain-extended hydroxyl-terminated and carboxyl-terminated polymeric materials.

The polyalkadienes suitable for use in the present invention are further characterized by having an elongated backbone carbon chain which is predominantly hydrocarbon in nature. The hydrocarbon content of said polyalkadienes should be at least about 90, preferably in the range of 92 to 96, weight percent. The elongated backbone carbon chain is characterized by the presence of a predominant amount of pendant non-terminal vinyl groups attached to alternating carbon atoms of the backbone of said polyalkadiene having the structure

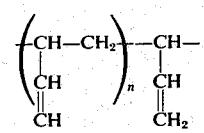

wherein $n$ is a measure of the degree of polymerization. The pendant non-terminal vinyl groups constitute at least 50 weight percent, preferably about 70 to about 97.5 weight percent, of the residual olefinic unsaturation of said polyalkadiene. The polyalkadienes which are suitable for use in forming the adhesive compositions of this invention generally have molecular weights in the range from about 500 to about 100,000, preferably in the range from about 10,000 to about 60,000, with an especially preferred range being about 35,000 to about 55,000. Thus, it will be seen that the polyalkadienes which can be employed in the presence of this invention include liquid polymers and solid gum polymers.

More particularly, the polyalkadienes which are compounded into the adhesive compositions of this invention will have molecular weights in excess of 10,000, preferably in the range of about 25,000 to about 60,000, and preferentially in the range of about 35,000 to about 55,000. As noted, the polyalkadienes can be either liquid polymers or solid gum polymers. In this regard, the hydroxyl-substituted, carboxyl-substituted, amine-substituted and mercaptan-substituted polyalkadienes as produced by the majority of the present commercial polymerization processes generally are liquid polymers having molecular weights in the range of about 500 to about 20,000; with the bulk of such substituted polyalkadienes having molecular weights in the range of about 750 to about 3,000. Thus, it will be appreciated that the hydroxyl-, carboxyl-, and mercaptan-substituted polyalkadienes will normally be chain-extended in order to increase their molecular weights to the ranges found most suitable in the present invention.

The hydroxyl-substituted, carboxyl-substituted, amine-substituted, and mercaptan-substituted polyalkadienes can be more specifically described as chemically functional substituted polyalkadiene prepolymers which are characterized by an elongated backbone carbon chain having pendant vinyl groups on alternate carbon atoms of the chain; a hydrocarbon content in excess of 90 percent, preferably in the range of 92 to 96 percent; said pendant vinyl groups being non-terminal, said pendant non-terminal vinyl groups constituting at least about 50 weight percent, preferably about 70 to about 97.5 weight percent, of the residual olefinic unsaturation of said polyalkadiene. Preferably, the functional substituted groups of the polyalkadiene prepolymer are positioned at the terminal ends of the prepolymer. While difunctional materials characterized by terminal substitution are preferred, other polyfunctional prepolymers having, for example, one terminal group and a second group located away from the other end of the prepolymer can be employed. The preferred polyalkadiene is a 1,2-polybutadienediol having hydroxyl substitutents positioned at the terminal ends of the prepolymer. Generally, such prepolymers desirably have molecular weights ranging from about 500 to about 3,000. Alternatively, the polyalkadiene prepolymer can be a 3,4 -polyisoprene material such as 3,4-polyisoprenediol. The polyfunctional substituted polyalkadiene is preferably a dihydroxy material but can be, for example, a dicarboxyl-substituted compound, a dimercapto-substituted compound, a diamine-substituted compound, or other polyalkadiene prepolymer having pendant chemically functional groups, at least one of such functional groups being terminally positioned. The polyalkadiene prepolymer should be predominately of the 1,2-configuration and desirably has at least about 70, preferably at least about 85, percent of the polymer structure having such 1,2-configuration. It is presently preferred that the prepolymer microstructure comprise at least about 90 percent 1,2-configuration.

When necessary, the original molecular weight of the polyalkadiene component can be readily modified to the desired range by conventional chain extension techniques, as by contacting the polyalkadiene prepolymer with a polyfunctional organic chain extender with thorough mixing, desirably followed by degassing. Chain extending reaction conditions are well-known in the art and will not be discussed here in great detail. As an example of such reaction conditions, the chain extension of a dihydroxy polyalkadiene prepolymer with a diisocyanate chain-extender such as 2,4-toluene diisocyanate is effected at room temperature or at moderately elevated temperatures. As is well-known in the art, the reaction conditions are a function of the materials employed and these conditions can be readily determined by one skilled in the art. The resulting chain-extended polyalkadiene has a substantially increased molecular weight range and, in physical appearance, can be a highly-viscous fluid or solid gum.

Organic chain extenders which are suitable for use in increasing to the value desired the molecular weight of the polyalkadiene prepolymers are generally difunctional materials but can contain more than two functional groups. Preferentially, the chain extenders are selected from the group consisting of diisocyanate-substituted aliphatic and aromatic compounds; diacid halide-substituted aliphatic and aromatic compounds; dicarboxylic acid-substituted aliphatic and aromatic compounds; diester-substituted aliphatic and aromatic compounds; diepoxide-substituted aliphatic and aromatic compounds; diamine-substituted aliphatic and aromatic compounds; dihydroxyl-substituted aliphatic and aromatic compounds; diaziridine-substituted aliphatic and aromatic compounds; anhydride-substituted aliphatic and aromatic compounds; dianhydride-substituted aliphatic and aromatic compounds, and diimine-, diimide-, and triimide-substituted aliphatic and aromatic compounds. The preferred polyfunctional organic chain extending agents for dihydroxy polyalkadiene prepolymers is an organic diisocyanate material which reacts at a moderately low temperature to form polyurethane bonds to increase markedly the molecular weight of the prepolymer.

The urethane bond formed in the chain extension of dihydroxy polyalkadiene prepolymers employing diisocyanate chain extenders is desirable in that there is no formation of a condensation product such as water or ammonia. The absence of a volatile condensation product makes the reaction particularly useful in the formation of an adhesive bond, laminates and compact plastic masses. Additionally, the diisocyanate-dihydroxy polyalkadiene prepolymer reaction takes place at a moderately low temperature to produce a long shelf-life, viscous to rubbery, material which can be stored for an indefinite period prior to use.

Other chain extenders which are particularly effective for increasing the molecular weight of hydroxy-containing polyalkadienes include dicarboxylic acids, diacid halides, diesters, acid anhydrides and dianhydrides. With such compounds, chain extension of the polyalkadiene prepolymer is effected through polyester groups. The use of dicarboxylic acids, diacid halides and diesters as chain extenders can result in the formation of volatile by-products, thereby making these particular chain extenders less desirable for many applications. Acid dianhydrides are secondarily preferred chain extenders for hydroxy-containing prepolymers because chain extension is generally effected without formation of by-products.

Particularly suitable chain extenders for carboxyl-containing polyalkadiene prepolymers include diols, diamines, diisocyanates, diepoxides, diimines and diimides, with diepoxides, diimines and diimides being especially preferred as the use of these chain extenders results in a minimum formation of undesirable by-products. Typical carboxyl-containing polyalkadiene prepolymers include 1,2-polybutadiene dicarboxylic acid and 3,4-polyisoprene dicarboxylic acid. It will be appreciated that other equivalents of the carboxyl-containing prepolymers, such as the diacid halide, polyanhydride and diester derviatives, can be chain-extended in a like manner to yield equivalent chain-extended polyalkadienes suitable for use in the practice of this invention.

Analogously, other functionally-substituted polyalkadiene prepolymers can be suitably chain-extended to afford polymeric materials which can be advantageously employed in the invention. For example, polyalkadiene prepolymers containing functionally-active amine groups can be chain extended with diisocyanates, anhydrides, dicarboxylic acids, diacid halides, diesters and diepoxides. In all instances, the chain extenders which produce no secondary product are preferred.

Representative diisocyanate compounds which can be used as chain extenders for polyalkadiene prepolymers include 2,4-toluene diisocyanate; hexamethylene diisocyanate; dianisidine; 1,4-benzene diisocyanate; p,p'-diphenylisocyanate methane; 1-chlorophenyl-2,4-diisocyanate; trimethylene diisocyanate; pentamethylene diisocyanate; butylene-1,2-diisocyanate; butylene-1,4-diisocyanate; xylene diisocyanate; 2,4-cyclohexylene diisocyanate; 1,1-dibutyl ether diisocyanate; 1,6-cyclopentane diisocyanate; 2,5-indene diisocyanate; 1,5-naphthalene diisocyanate, and triphenylmethane diisocyanate.

Representative acid and acid anhydride chain extenders suitable for use in the practice of the invention are adipic acid, fumaric acid, 1,4-cyclohexanedicarboxylic acid, terephthalic acid, malonic acid, azelaic acid, sebacic acid, isophthalic acid, endo-cis bicyclo (2.2.1)-5-heptane-2,3-dicarboxylic dianhydride, succinic anhydride, dodecenyl succinic anhydride, tetrahydrophthalic anhydride, hexahydrophthalic anhydride, maleic anhydride, phthalic anhydride, glutaric anhydride, 1,4,5,6,7,7-hexachlorobicyclo-[2.2.1]-5-heptane-2, 3-dicarboxylic anhydride, and tetrachlorophthalic anhydride.

Among the dianhydride and polyanhydride chain extenders that can be employed are 3,3,4,4-benzophenone tetracarboxylic dianhydride, polyazelaic polyanhydride, pyromellitic dianhydride, pyromellitic dianhydride-glycol adducts, and 1,2,3,4-cyclopentanetetracarboxylic dianhydride.

Representative diepoxide chain extenders include epoxy novolaks, bisepoxydicyclopentyl ether of ethylene glycol, epichlorhydrin/bis-phenol A type, 1-epoxyethyl-3,4-eipxycyclohexane, dicyclopentadiene dioxide, limonene dioxide, bis-(2,3-epoxypropoxy)-benzene, vinylcyclohexane dioxide, 3,4-eipxy-6-methyl cyclohexylmethyl-3,4-epoxy-6-methyl cyclohexanecarboxylate, zeaxanthin diepoxide, and 9,10-epoxy-12-hydroxyoctadecanoic acid triester with glycerol.

Suitable diimine, diimide, and triimide chain extenders include 1,6-hexane-N,N'-diethylenimide; 1,6-hexane-N,N-dipropylenimine; 1,7-heptane-N,N'-diethylenimide; 1,7-heptane-N,N'-dipropylenimide; 1,8-octane-N,N'-diethylenimide; 1,8-octane-N,N'-dirpopylenimine; 1,3-di(czrboxy-N-propylenimide) benzene; 1,3,5-tri(carboxy-N-propylenimide) benzene; and 1,3-di(ethylene-N-1,2-butylimine)benzene.

If desired, a catalyst can be employed to accelerate the chainextension reaction. For example, in forming the urethane bond between the diisocyanate and the hydroxy-containing polyalkadiene prepolymer it is sometimes desirable to provide a catalyst which promotes polyurethaneation. Suitable catalyst to promote the formation of the chain-extending bonds through the reactions of other compounds are well-known in the art. Similarly, the conditions generally favoring the reactions involving other combinations of reactants are known. For example, the chain-extension reaction occurring between a dicarboxyl polyalkadiene prepolymer and a diimine organic chain-extender will ordinarily be carried out in the range of 20° to 90° C and that of a dicarboxyl polyalkadiene prepolymer and a diepoxide chain-extender will ordinarily be carried out in the range of 50° to 120°. In the instance where the 1,2-polybutadienediol or 3,4-polyisoprene diol is chain-extended through an ester linkage by reaction with a dibasic acid, the reaction is typically carried out in the range of 80° to 135°. A dianhydride chain-extension with a dihydroxypolyalkadiene prepolymer will proceed ordinarily at temperatures of approximately 20° to 30° C lower than that of the corresponding dibasic acid reaction. A chain-extension employing a diacidhalide reacting with a dihydroxypolyalkadiene prepolymer will ordinarily proceed in the general range of 40° to 100° C. It will be appreciated that the presence or absence of a catalyst will have a bearing upon the reaction conditions. The foregoing temperature ranges are provided to give only an indication of general conditions and are not intended to be limiting.

The overall reaction system for the preparation of the chain-extended substituted polyalkadienes is illustrated by the following schematic reaction, in which 2,4-toluene diisocyanate has been used as an example of those compounds which can be used to effect chain extension of a polybutadiene containing two terminal hydroxyl groups:

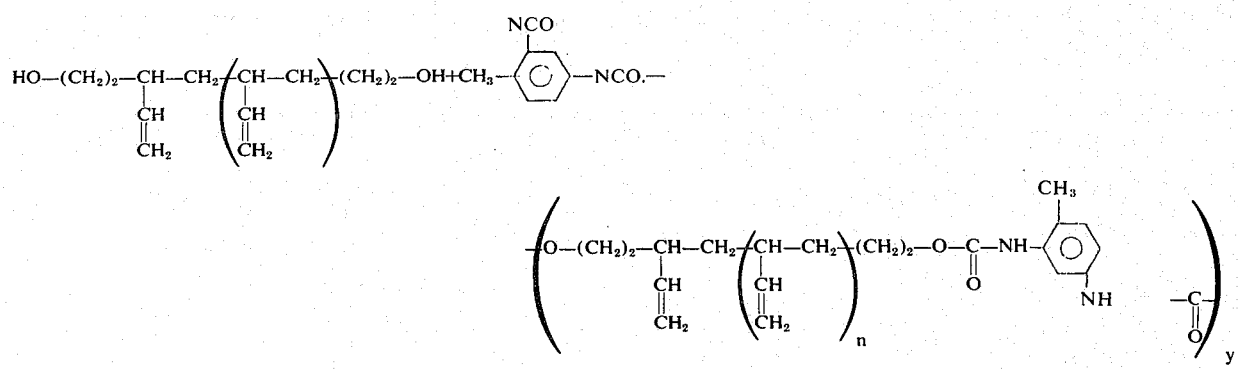

As can be seen from the foregoing reaction scheme, the reaction between the polybutadiene-diol and the diisocyanate results in a polyurethanated polyalkadiene product. In the equation sequence, x typically represents an integer sufficiently high to provide an average molecular weight in the range of about 500 to about 3,000, in the prepolymer; and y is sufficiently high integer to provide a polyurethanated polyalkadiene product having a molecular weight within the range specified, supra.

Analogous reactions can be drawn for the chain extension process when the polyalkadiene is derived from other alkadienes, when it contains active terminal groups which are not hydroxyl groups, and when chain extenders other than 2,4-toluene diisocyanate are being used. The details of the structures of the chain-extended reaction products will vary depending on the choice of the polyalkadiene prepolymer and chain extender used.

Because it is possible to more suitable control the molecular weight of the polyalkadiene component, it is presently preferred to employ chainextended functionally-substituted polyalkadienes in the practice of the invention. Of such materials, those derived from hydroxyl-containing and carboxyl-containing prepolymers are preferred, with the chain-extended hydroxyl-containing polyalkadienes being preferentially empoyled. For the chain extension reaction, it is presently preferred that a slight molar excess, up to about 10 percent, of chain extender be present.

The polyfunctional aminoorganosilane compounds which are suitable for use in the practice of the invention are characterized by the presence of a single organic chain containing at least one amino nitrogen atom connected to silicon through an organic group containing at least three interconnected carbon atoms, with each amino nitrogen atom having bonded thereto at least one amino hydrogen atom.

Thus, the aminoorganosilane compounds which are employed in the practice of the invention are compounds containing one silicon atom, said silicon atom having attached thereto an organic chain containing one or more amino groups, each of said amino containing at least one nitrogen-bonded hydrogen atom, said amino groups being separated from said silicon atom by a chain of at least three interconnected carbon atoms.

More particularly, the aminoorganosilane compounds contain the characteristic grouping

wherein $R^o$ is a divalent organic radical selected from the group consisting of saturated aliphatic acyclic, saturated aliphatic cyclic, unsaturated aliphatic acyclic, unsaturated aliphatic cyclic or aromatic radicals having a chain of at least 3 carbon atoms, wherein the nitrogen atom is attached to at least a third carbon removed from the silicon; and wherein the unfilled valence of the nitrogen atom is satisfied by a member selected from the group consisting of hydrogen, a monovalent organic group containing at least one amino group and a monovalent organic group characterized by the absence of an amino group, e.g., hydrocarbyl, cyanoalkyl, and the like; and wherein the silicon atom is bonded to at least one oxygen atom which is in turn bonded to a hydrocarbon group and each remaining unfilled valence of the silicon atom is satisfied by a hydrocarbon through silicon to carbon linkage.

Aminoorganosilane compounds which are particularly suitable in the practice of the invention have the characteristic formula

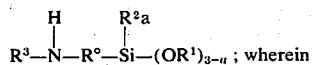

$R^o$ is a divalent aliphatic, cycloaliphatic or aromatic radical having from 3 to 20 carbon atoms, and is preferably an alkylene radical having from 3 to 9 carbon atoms;

$R^1$ is a monovalent aliphatic, cycloaliphatic or aromatic radical having from 1 to 20 carbon atoms, and is preferably an alkyl radical having from 1 to 8 carbon atoms;

$R^2$ is a monovalent aliphatic, cycloaliphatic or aromatic radical having from 1 to 20 carbon atoms, and is preferably selected from the group consisting of alkyl radicals having from 1 to 8 carbon atoms, cycloalkyl radicals having from 4 to 7 ring carbon atoms, and aryl radicals having 6, 10 or 14 nuclear carbon atoms, and including such aryl radicals containing one or more substituent alkyl groups of 1 to 8 carbon atoms;

$R^3$ is selected from the group consisting of hydrogen and monovalent aliphatic, cycloaliphatic or aromatic radicals and — $R^4$ — NH — $R^5$, wherein $R^4$ is selected from the group consisting of divalent aliphatic, cycloaliphatic and aromatic radicals having from 1 to 20 carbon atoms, there being preferably at least 2 carbon atoms separating any pair of amino nitrogen atoms, with $R^4$ being preferentially an alkylene group of 2 to 9 carbon atoms, $R^5$ being the same as $R^3$ and preferentially is hydrogen and $a$ is zero or 1, and preferentially is zero.

Thus, it will be appreciated that both primary and secondary aminoorganosilane compounds, and also such compounds containing in their structure a single primary amino grouping and one or more secondary amino groupings can be employed in the compositions of this invention. It is also possible to employ aminoorganosilanes containing one or more tertiary amino grouping providing that such compounds contain also at least one primary amino grouping. At present, amino-organosilane compounds characterized by the presence of a primary amino grouping are preferred.

Representative aminoorganosilane compounds which can be employed in the practice of this invention include, without limitation, gamma-aminopropyltriethoxysilane; gamma-aminopropyltripropoxysilane; gamma-aminoisobutyltriethoxysilane; gamma-aminopropylmethyldiethoxysilane; gamma-aminopropylethyldiethoxysilane; gamma-aminopropylphenyldiethoxysilane; delta-aminobutyltriethoxysilane; delta-aminobutylmethyldiethoxysilane; delta-aminobutylethyldiethoxysilane; delta-aminobutylcyclohexyldiethoxysilane; delta-aminobutylphenyldiethoxysilane; gamma-aminobutylmethyldiethoxysilane; gamma-aminobutyltriethoxysilane; N-methyl-gamma-aminopropyltriethoxysilane; N-phenyl-gammaaminoisobutylmethyldiethoxysilane; N-ethyl-delta-aminobutyltriethoxysilane; N-gamma-aminopropyl-gamma-aminopropyltriethoxysilane; N-beta-aminoethyl-gamma-aminoisobutyltriethoxysilane; N-gamma-aminopropyl-delta-aminobutyltriethoxysilane; N-omegaaminohexyl-gamma-aminoisobutylmethyldiethoxysilane; and the like. These and other similar aminoorganosilane compounds which can be utilized in the present invention are well-known and can be produced in the manner described in U.S. Pat. Nos. 2,832,754; 2,947,771; 2,928,858; 2,928,892; and 2,930,809.

The polyfunctional aminoorganosilane compound or mixture of such compounds will be employed in amounts in the range of about 2 to about 50, preferably about 10 to about 40, parts by weight per 100 parts of high vinyl content polyalkadiene.

Various conventional additives, such as filler, colorants, supplemental film formers and the like, can be included in the adhesive compositions of the present invention without deleteriously affecting the advantageous properties thereof. Quite often, the inclusion of additives may enhance the viscosity and other properties desirably from the standpoint of application of the adhesive. Representative of suitable filler materials are finely divided substantially inert solid materials such as carbon black, zinc oxide and titanium dioxide. Such conventional additives can be used in amounts corresponding to the customary ranges at which these additives are normally employed, e.g., in the range of about 15 to about 100 parts by weight per 100 parts by combined weight of polyalkadiene and aminoorganosilane compounds.

The adhesive compositions of this invention are prepared by conventional procedures such as by blending on a ball mill. The resulting homogeneous mixtures are preferably diluted with an inert solvent or diluent such as acetone, methyl ethyl ketone, benzene, toluene, xylene, and the like, including mixtures of such solvents/- diluents, to afford an adhesive lacquer having a viscosity in the range from about 25 to about 5000, preferably about 50 to about 400, centipoises at a total solids content in the range from about 3 to about 30, preferably about 5 to about 20, percent.

The novel polyalkadiene-aminoorganosilane compositions herein described have been discovered to be especially suitable as bonding agents for vulcanizable elastomeric compositions. More particularly, the herein described polyalkadiene-aminoorganosilane compositions are unexpectedly effective in bonding a wide variety of vulcanizable elastomeric materials to themselves and to other substrates.

The vulcanizable elastomeric materials which can be bonded in accordance with this invention are selected from the group consisting of sulfur-vulcanizable poly(alkylene oxide) elastomers; sulfur-vulcanizable elastomers having a vinyl content of at least 52 weight percent, based on residual olefinic unsaturation; free radical-vulcanizable ethylene/propylene/non-conjugated (EPDM) terpolymer elastomers; free radical-vulcanizable ethylene/propylene (EPM) elastomers; free radical-vulcanizable silicone elastomers; free radical-vulcanizable ethylene/vinylacetate elastomers; and free radical-vulcanizable elastomers having a vinyl content of at least 52 weight percent, based on residual olefinic unsaturation.

The sulfur-vulcanizable poly(alkylene oxide) elastomers which can be bonded in accordance with this invention comprise the polymers and copolymers prepared by the polymerization of at least one alkylene oxide, with or without other copolymerizable monomers, to obtain an elastomeric material having a sufficient degree of unsaturation to permit the use of sulfur mechanisms for curing or vulcanizing the elastomer. These recently developed elastomeric materials possess properties valuable in dynamic applications requiring high resilience, good flex-life and low-temperature stability, and, additionally, these elastomers are highly resistant to environmental attack, e.g., these materials are resistant to degradation from environmental conditions such as heat, ozone, oil, and the like. The combination of physical and chemical characteristics of these poly(alkylene oxide)-type elastomers are such that it is desirable to employ these elastomers in combination with substrates such as metals for applications such as body and motor mounts. Known adhesive compositions, as a general rule, have been unsuitable in bonding these elastomers to various substrates, particularly metal substrates, even when priming coats are employed.

More particularly, the sulfur-vulcanizable poly(alkylene oxide) elastomers which can be bonded in accordance with this invention are selected from the group consisting of homopolymers of at least one unsaturated alkylene oxide having from 2 to 20 carbon atoms, copolymers of at least one saturated alkylene oxide having from 2 to 20 carbon atoms and at least one unsaturated alkylene oxide having from 2 to 20 carbon atoms, copolymers of at least one saturated alkylene oxide having from 2 to 20 carbon atoms and at least one different unsaturated monomer copolymerizable therewith, copolymers of at least one unsaturated alkylene oxide having from 2 to 20 carbon atoms and at least one different saturated monomer copolymerizable therewith, and copolymers of at least one unsaturated alkylene oxide and at least one different unsaturated monomer copolymerizable therewith. Such polymers are well-known in the art and an understanding of the invention does not require an extended description of these materials or their preparation. A non-limiting example of such elastomers is the commercially available product PAREL, a registered trademark of Hercules, Inc., a copolymer of propylene oxide and allyl glycidyl ether.

Non-limiting examples of monomers which can be polymerized to provide suitable poly(alkylene oxide)-type elastomers are ethylene oxide; propylene oxide; 1,2-epoxybutane; 2,3-epoxybutane; 1,2-epoxyheptane; 2,3-epoxyoctane; 2,3-dimethyl-2,3-epoxypentane; 2,3-epoxy-4-methylpentane; 1,2-eopxy-4,4-dimethylpentane; 4,5-epoxyeicosane; epichlorhydrin; 1-bromo-2,3-epoxypropane; 1,5-dichloro-2,3-epoxypentane; 2-iodo-3,4-epoxybutane; styrene oxide; 6-oxabicyclo [3.1.0]-hexane; 3-propyl-7-oxabicyclo [4.1.0]-heptane; bis (2,3-epoxybutyl) ether; t-butyl 4,5-epoxyhexyl ether; 2-phenylethyl 3,4-epoxybutyl ether; allyl glycidyl ether; 1-methallyl 3,4-epoxyhexyl ether; 3-hexenyl 5,6-epoxyhexyl ether; 2,6-octadienyl 2,3,7,8-diepoxyoctyl ether; 6-phenyl-3-ethyl-5,6-epoxyhexyl ether; 3,4-epoxy-1-butene; 5-phenyl-3,4-epoxy-1-pentene; 6,7-di-n-butyl-3,4,9,10-diepoxy-1,11-dodecadiene; epoxy vinyl ether; allyl 2-methyl-2,3-epoxypropyl ether; 3-cyclohexyl-2-propenyl 4-cyclohexyl-3,4-eopxybutyl ether; 1-methallyl 6-phenyl-3,4-epoxyhexyl ether; 5-(4-tolyl)2,3-epoxypentyl vinyl ether; 2-(2,4-cyclohexadienyl)-ethyl 2,3-epoxybutyl ether; 2-(2,5-cyclohexadienyl) ethyl 2-benzyl-4,5-epoxypentyl ether; 3,4-epoxy-4-(2,3-dimethylphenyl)-1-butene; 5-(4-methyl cyclohexyl) 3,4-epoxy-1-pentene; 4,5-diethyl-4,5-epoxy-2,6-octadiene 4-(2,4-cyclopentadienyl)-1,2,6,7-diepoxyheptane; and 1-phenyl-1,2-epoxy-5,7-octadiene Substantially all of the chain saturated copolymers of ethylene, propylene and a non-conjugated diene known in the art as EPDM elastomers which can be vulcanized by free radical-vulcanization systems can be bonded using the novel adhesive compositions of this invention. The types of EPDM elastomers currently available commercially differ principally in the composition of the diene. The dienes most used commercially are 1,4-hexadiene, dicyclopentadiene, 5-ethylidene-2-norbornene and 5-ispropylidene-2-norbornene. These elastomers are well-known in the art and a detailed discussion, including their preparation, of these elastomers is not a requisite for an understanding of their use in accordance with this invention.

Substantially all of the ethylene-propylene copolymer elastomers generally referred to as EPM elastomers and vulcanizable by free radical systems can be effectively bonded using the novel adhesive compositions of this invention. As with the EPDM elastomers, the EPM elastomers are well-known commercially available materials and to understand their use in accordance with the invention does not require a discussion of these elastomers.

The free radical-vulcanizable silicone elastomers such as are available under various commercial trademarks, tradenames from manufacturers such as General Electric, Dow Corning, Stauffer Chemical and Union Carbide can be bonded utilizing the adhesive compositions described herein. Again, there is no necessity to discuss these various silicone elastomers to fully understand their use herein.

Also bondable with the herein-described adhesive systems are ethylene-vinyl acetate copolymeric elastic materials containing from about 35 to about 70 percent by weight vinyl acetate. These materials are also well-known, e.g., Santogum elastomers, a trademark of Monsanto Corporation.

The adhesive systems of this invention have been found to be effective bonding agents for elastomeric materials vulcanizable by any conventional vulcanization system, e.g., sulfur, free radical, and the like and having as a characteristic feature a vinyl content in excess of about 52 weight percent, based on residual olefinic unsaturation. Particularly preferred elastomers in this category included the hydroxy functional, carboxy functional, amine functional and mercaptan functional polyalkadienes. Such elastomers are generally obtained by emulsion, suspension and solution polymerization of a desired monomer charge in the presence of appropriate catalysts and other polymerization aids. A more detailed description of these materials is not necessary for an understanding of the invention.

The adhesive compositions of this invention are particularly suited for bonding the above-described elastomers to themselves or to other substrates, in particular, ferrous and non-ferrous metals such as steel (including stainless steel), copper (including copper alloys such as brass), aluminum and its alloys, magnesium and its alloys, silver and the like.

The adhesive compositions of the present invention are readily applied by conventional means, such as by dipping, brushing, spraying, etc., to either or both of the surfaces to be joined. Where a primer is employed, the compositions can be applied directly over such primer coats. Generally, the adhesive compositions are allowed to dry after application to remove the solvent. This can be accomplished at ambient conditions in 30 to 60 minutes. Solvent evaporation rate can be increased by the use of heat, forced air, or both. As a general rule, forced drying temperatures should be maintained below 200° F.

The surfaces to be bonded are then brought together with a dried adhesive face therebetween, and the adhesive cured under heat and sufficient pressure to insure intimate contact of the surfaces being bonded and the adhesive. The bonding can be effected at temperatures ranging from about 250° to about ° F for a time commensurate with the temperature employed. In the general case, at the lower temperatures, a longer curing time will be required to afford adequate bonding, whereas, at the higher temperatures, adequate bonding values may be obtained in a matter of minutes. Typical representative curing conditions are 2 hours at 250° F, 60 minutes at 270° F, and 30 minutes at 300° F. The elastomer is vulcanized using a sulfur-based or free radical-based vulcanization system concurrently with the adhesive compositions.

The following examples are provided for purposes of illustrating the invention. It will be understood that the invention is not to be limited to these examples nor to the specific details enumerated. Parts are parts by weight unless otherwise expressed.

In the examples, in bonding the elastomer to a metal substrate, unless otherwise noted the substrate surface is primed with a conventional chlorinated rubber-base primer coat. The assembly is then cured and the adhesive bond tested according to ASTM standard D-429, Method B, modified to 45° angle of pull.

The bonded structures are subjected to various tests, including room temperature (RT) pull, the boiling water test, and the salt spray test. In the RT pull test, the rubber body is peeled from the metal at a 45° angle using a Scott tensile tester and the force required in pounds per inch is recorded. In the boiling water test, bonded samples after having been scored at the bond-line and prestressed by bending the rubber body back from the metal, are immersed in boiling water for 2 hours; and in the salt spray test, the samples, after scoring and prestressing, are exposed to a spray of salt solution (5% sodium chloride) for 48 hours at 100° F. The samples so treated are tested for relative bond strength by pulling the rubber body from the metal.

In the data given in the examples, reference is made to failure in the rubber body (R), between the adhesive composition and the rubber (RC), between the adhesive composition and the primer (CP), between the primer and the metal (PM), or between the adhesive composition and the metal (CM) when no primer is listed. Failure is expressed in terms of percent, e.g., with no metal primer, 95R means that 95 percent of the failure occurred in the rubber body itself and not between the adhesive composition and the rubber (RC) or between the adhesive composition and the metal (CM).

EXAMPLE I

An adhesive is prepared from 100 parts by weight methylene bis (4-phenyl isocyanate) chain-extended 1,2-polybutadienediol (MW ca 45,000), 0-20 parts by weight γ-aminopropyltriethoxysilane, 0-0.2 parts by weight black azo dye and sufficient toluene to provide a total solids content (TS) of 20 percent. The proportions of materials, in parts by weight, is set forth as follows:

|  | A | B | C | D | E | F |
| --- | --- | --- | --- | --- | --- | --- |
| Methylene bis(4-phenyl isocyanate) chain-extended 1,2-polybutadienediol | 100 | 100 | 100 | 100 | 100 | 100 |
| γ-aminopropyltriethoxysilane | 0 | 2 | 6 | 10 | 20 | 20 |
| Black azo dye | 0 | 0 | 0 | 0 | 0 | 0.2 |
| Toluene (to 20% TSC) | | | | | | |

These adhesives are used to bond to non-primed grit-blasted degreased cold-rolled steel a sulfur-vulcanizable propylene oxide/allyl glycidyl ether elastomer stock having the composition:

|  | Parts by Weight |
| --- | --- |
| Propylene oxide/allyl glycidyl ether elastomer | 100.00 |
| Carbon black | 30.00 |
| Zinc oxide | 5.00 |
| Stearic acid | 1.00 |
| Nickel dibutyldithiocarbamate | 1.0 |
| Tetramethylthiuram monosulfide | 1.5 |
| 2-mercaptobenzothiazole | 1.5 |
| Aromatic process oil (ASTM D-2222 type 102) | 5.0 |
| Sulfur | 1.25 |

The elastomer stock is cured at 320° F for 25 minutes. Peel adhesion tests are performed in accordance with ASTM D-429, Method B modified to 45° with the following results:

| Run | Adhesive | Peel Adhesion Lb./In. | Failure | |
|---|---|---|---|---|
| 1 | A | 8 | 90 CM, | 10 RC |
| 2 | A | 12 | 85 CM, | 15 RC |
| 3 | B | 30 | 10 R, | 90 CM |
| 4 | B | 31 | 10 R, | 5 RC, 85 CM |
| 5 | C | 34 | 10 R, | 90 CM |
| 6 | C | 33 | 5 R, | 95 CM |
| 7 | D | 36 | 99 R, | 1 CM |
| 8 | D | 37 | 75 R, | 25 CM |
| 9 | E | 43 | 30 R, | 70 CM |
| 10 | E | 38 | 80 R, | 20 CM |
| 11 | F | 61 | 100 R | |
| 12 | F | 70 | 99 R, | 1 CM |

EXAMPLE II

The adhesive compositions of the previous example are applied over grit-blasted degreased cold-rolled steel primed with a conventional chlorinated elastomer primer. The metal is then bonded to a propylene oxide-/allyl glycidyl ether stock of the preceding example. Peel adhesion tests are performed according to the procedure of the preceding example with the following results:

| Run | Adhesive | Peel Adhesion Lb./In. | Failure | |
|---|---|---|---|---|
| 1 | A | 50 | 95 R, | 5 RC |
| 2 | A | 48 | 100 R | |
| 3 | B | 54 | 99 R, | 1 CP |
| 4 | B | 56 | 100 R, | |
| 5 | C | 51 | 100 R | |
| 6 | C | 45 | 70 R, | 30 CP |
| 7 | D | 59 | 98 R, | 2 CP |
| 8 | D | 60 | 100 R | |
| 9 | E | 60 | 100 R | |
| 10 | E | 56 | 100 R | |
| 11 | F | 72 | 100 R | |
| 12 | F | 65 | 100 R | |

EXAMPLE III

An adhesive formulation comprising 100 parts by weight methylene diphenylisocyanate chain-extended 1,2-polybutadienediol (MW ca. 45,000), 20 parts by weight γ-aminopropyltriethoxy silane, 0.2 parts by weight azo black dye and sufficient toluene to provide a total solids content of 15% was applied over grit-blasted degreased cold-rolled steel primed with a conventional chlorinated rubber-base primer. The metal was bonded to a sulfur-vulcanizable propylene oxide-/allyl glycidyl ether elastomer stock comprising 100 parts by weight elastomer, 50 parts by weight carbon black, 5 parts by weight zinc oxide, 1 part by weight stearic acid, 1 part by weight nickel dibutyldithiocarbamate, 1.5 parts by weight tetramethylthiurammonosulfide, 1.5 parts by weight 2-marcaptobenzothiazole and 1.25 parts by weight elemental sulfur. The elastomer stock is cured at 320°for 25 minutes. Peel adhesion, boiling water and salt spray tests are made with the following results:

| Peel Lb./In. | Adhesion Failure | Boiling Water,2 hrs. | Salt Spray (48 hrs., 5% salt) |
|---|---|---|---|
| 117 | 100 R | 98 R, 2 CM | 100 R |

EXAMPLE IV

An adhesive is prepared from 100 parts by weight methylenediphenylisocyanate chain-extended 1,2-polybutadienediol (MW 40,000), 20 parts by weight γ-aminopropyltriethoxysilane, 0.2 parts by weight black azo dye and sufficient toluene to provide a total solids content of 15 percent. The adhesive is used to bond grit-blasted degreased cold rolled steel to various elastomers in the presence of various vulcanization agents. Except where noted, the steel substrate is primed with chlorinated-rubber adhesive. The following results are obtained:

| Run | Elastomer | Vulcanization Agent | Peel Strength Lbs./In. ASTM D 429-B Mod. to 45° | Failure |
|---|---|---|---|---|
| 1[a] | EPDM[b] | Peroxide | 80 | 100 R |
| 2[a] | EPDM | Sulfur & Peroxide | 16 | 50 RC 50 PM |
| 3 | EPDM | Sulfur | 29 | 100 RC |
| 4 | EPM[c] | Peroxide | 52 | 100 R |
| 5[a] | Silicone | Peroxide | 22 | 100 R |
| 6 | Natural rubber | Sulfur | 26 | 100 RC |
| 7 | Epichlorhydrin | Sulfur | 0 | 100 RC |
| 8 | Poly(alkylene oxide)-type[d] | Sulfur | 104 | 100 R |
| 9 | Eva[e] | Peroxide | 150 | 100 R |

[a] = Primer not used on metal surface.
[b] = Ethylene/propylene/non-conjugated diene rubber.
[c] = Ethylene/propylene rubber.
[d] = Propylene oxide/allyl glycidyl ether rubber.
[e] = Ethylene/vinyl acetate rubber.

What is claimed is:
1. A composition of matter consisting essentially of
   a. at least one polymeric material selected from the group consisting of polyalkadienes, hydroxyl-functional polyalkadienes, chain-extended hydroxyl-functional polyalkadienes, carboxyl-functional polyalkadienes, chain-extended carboxyl-functional polyalkadienes, amine-functional polyalkadienes, chain-extended amine-functional polyalkadienes, mercaptanfunctional polyalkadienes, and chain-extended mercaptan-functional polyalkadienes;
   said polymeric materials having as a characteristic feature an elongated backbone carbon chain having as recurring units pendant nonterminal vinyl groups attached to alternating carbon atoms of said backbone in accordance with the structure

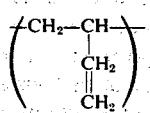

said pendant non-terminal vinyl groups constituting at least 50 weight percent of the residual olefinic unsaturation of said polymeric material;
said polymeric material having a molecular weight in the range from about 10,000 to about 100,000; and
b. at least one aminoorganosilane characterized by the grouping

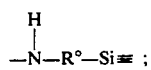

wherein R° is a divalent organic radical selected from the group consisting of saturated aliphatic acyclic, saturated aliphatic cyclic, unsaturated aliphatic acyclic, unsaturated aliphatic cyclic, or aromatic radicals having a chain of at least three interconnected carbon atoms; wherein the nitrogen atom is attached to at least a third carbon removed from the silicon atom; and wherein the unfilled valence of the nitrogen atom is satisfied by a member selected from the group consisting of hydrogen, a monovalent organic group containing at least one amino group, and a monovalent organic group characterized by the absence of an amino group; and
wherein the silicon atom is bonded to at least one oxygen atom which in turn is bonded to a hydrocarbon group, and wherein each remaining unfilled valence of said silicon atom is satisfied by a monovalent hydrocarbon radical through silicon to carbon linkage,
the amount of said aminoorganosilane being in the range of from about 2 to about 50 parts by weight per 100 parts by weight of said polymeric material.

2. A composition of matter according to claim 1 wherein said aminoorganosilane has the characteristic formula

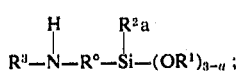

wherein R° is a divalent saturated aliphatic acyclic, saturated aliphatic cyclic, unsaturated aliphatic acyclic, unsaturated aliphatic cyclic, or aromatic radical containing from 3 to 20 carbon atoms;
wherein R¹ is a monovalent saturated aliphatic acyclic, saturated aliphatic cyclic, unsaturated aliphatic acyclic, unsaturated aliphatic cyclic, or aromatic radical containing from 1 to 20 carbon atoms;
wherein R² is a monovalent saturated aliphatic acyclic, saturated aliphatic cyclic, unsaturated aliphatic acyclic, unsaturated aliphatic cyclic, or aromatic radical containing from 1 to 20 carbon atoms;
wherein R³ is selected from the group consisting of hydrogen, monovalent saturated aliphatic acyclic or cyclic radicals having from 1 to 20 carbon atoms, monovalent unsaturated aliphatic acyclic or cyclic radicals having from 2 to 20 carbon atoms, monovalent aromatic radicals having from 6 to 20 carbon atoms, or — R⁴ — NH — R⁵ , R⁴ being selected from the group consisting of divalent saturated aliphatic acyclic, saturated aliphatic cyclic, unsaturated aliphatic acyclic, unsaturated aliphatic cyclic, or aromatic radicals having from 1 to 20 carbon atoms and R⁵ is the same as R³; and
wherein a is zero or 1.

3. A composition of matter according to claim 2 wherein the molecular weight of said polymeric material is in the range from about 10,000 to about 60,000.

4. A composition of matter according to claim 3 wherein said polymeric material is selected frm the group consisting of chain-extended hydroxyl-functional polyalkadienes, chain-extended carboxyl-functional polyalkadienes, chain-extended amine-functional polyalkadienes and chain-extended mercaptan-functional polyalkadienes.

5. A composition of matter according to claim 4 wherein said polymeric material is selected from the group consisting of chain-extended hydroxyl-functional polyalkadienes.

6. A composition of matter according to claim 5 wherein said polymeric material has a molecular weight in the range of about 35,000 to about 55,000.

7. A composition of matter according to claim 5 wherein said polymeric material is selected from the group consisting of chain-extended polybutadiene-diol.

8. A composition according to claim 3 dispersed in an inert diluent, said diluent being present in an amount to provide a lacquer composition suitable for use as an adhesive, said lacquer having a total solids content in the range from about 3 to about 30 percent.

9. A lacquer composition according to claim 8 having incorporated therein at least one inert additive.

10. A lacquer composition according to claim 8 wherein said polymeric material is selected from the group consisting of chain-extended hydroxyl-functional polyalkadienes.

11. A lacquer composition according to claim 10 wherein said polymeric material is selected from the group consisting of chain-extended polybutadiene-diol.

12. A lacquer composition according to calim 11 wherein said chain-extended polybutadiene-diol has a molecular weight in the range of about 35,000 to about 55,000 and said lacquer has a total solids content in the range of about 5 to about 20 percent.

13. A composition according to claim 3 wherein, in said aminoorganosilane, R° is an alkylene group having from 3 to 9 carbon atoms; R¹ is an alkyl radical having from 1 to 8 carbon atoms; R² is selected from the group consisting of alkyl radicals having from 1 to 8 carbon atoms, cycloalkyl radicals having from 4 to 7 ring carbon atoms, and aryl radicals having 6, 10 or 14 nuclear carbon atoms; and R³ is selected from the group consisting of hydrogen and — R⁴ — NH₂ , R⁴ being an alkylene group having from 2 to 9 carbon atoms.

14. A composition according to claim 13 wherein said polymeric material is selected from the group consisting of chain-extended hydroxyl-functional polyalkadienes.

15. A composition according to claim 14 wherein said polymeric material is selected from the group consisting of chain-extended polybutadiene-diol.

16. A composition according to claim 15 wherein said polymeric material has a molecular weight in the range of 35,000 to about 55,000.

17. A composition according to claim 13 dispersed in an inert diluent, said diluent being present in an amount sufficient to provide a lacquer composition suitable for use as an adhesive, said lacquer having a total solids content in the range from about 3 to about 30 percent.

18. A lacquer composition according to claim 17 having incorporated therein at least one inert additive.

19. A lacquer composition according to claim 17 wherein said polymeric material is selected from the group consisting of chain-extended hydroxyl-functional polyalkadienes.

20. A lacquer composition according to claim 19 wherein said polymeric material is selected from the group consisting of chain-extended polybutadiene-diol.

21. A lacquer composition according to claim 20 wherein said polymeric material has a molecular weight within the range of about 35,000 to about 55,000, and said lacquer has a total solids content in the range from about 5 to about 20 percent.

22. A lacquer composition according to claim 21 wherein said aminoorganosilane is gamma-aminopropyltriethoxysilane.

23. A lacquer composition according to claim 22 wherein said polymeric material is methylene-bis(phenylisocyanate)-extended polybutadiene-diol.

* * * * *